United States Patent Office 3,557,075
Patented Jan. 19, 1971

3,557,075
PROCESS AND CATALYST FOR PRODUCTION OF LIQUID POLYMERS
Rudolf H. Gaeth, Lake Jackson, Tex., assignor to Phillips Petroleum Company, a corporation of Delaware
No Drawing. Filed Nov. 20, 1967, Ser. No. 684,503
Int. Cl. C08d 1/14, 3/08
U.S. Cl. 260—94.3
10 Claims

ABSTRACT OF THE DISCLOSURE

A catalyst system comprising a niobium halide, a niobium oxyhalide, a niobium trihalodicarboxylate or mixtures thereof and a mixture of (1) a nickel compound such as nickel oxide, a nickel salt of an organic or inorganic acid, a nickel salt of a beta-diketone, or a complex compound of nickel such as dicyclopentadienylnickel, nickel tetracarbonyl, or the nickel complex with the ester of acetoacetic acid, and (2) an organometallic compound or a lithium aluminum hydride represented by the formulas $R_mAlCl_n$, $LiAlH_xR_{(4-x)}$, and $R_yM'$ wherein R is a saturated aliphatic, saturated cycloaliphatic, or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal, is employed for the polymerization of butadiene. Liquid polymers are obtained using the catalysts of this invention. The products can be hydrogenated immediately following polymerization with the polymerization catalyst functioning as the catalyst for the hydrogenation step.

BACKGROUND OF THE INVENTION

Low molecular weight polymers which are either liquid or soft rubbers are useful as plasticizers for thermoplastics, in adhesive formulations, as binders for solid fuel propellants as well as for a variety of other applications. Accordingly, processes which are capable of producing polymers of this type are of considerable value.

THE INVENTION

I have now discovered polymerization of butadiene using a catalyst system comprising a niobium compound such as a niobium halide, a niobium oxyhalide, or a niobium trihalodicarboxylate, and a mixture of (1) a nickel compound such as nickel oxide, a nickel salt of an organic or inorganic acid, a nickel salt of a beta-diketone, or a complex compound of nickel such as dicyclopentadienylnickel, nickel tetracarbonyl, or the nickel complex with the ester of acetoacetic acid, and (2) an organometallic compound or a lithium aluminum hydride represented by the formulas $R_mAlCl_n$, $LiAlH_xR_{(4-x)}$, and $R_yM$ wherein R is a saturated aliphatic, saturated cycloaliphatic, or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal, results in the formation of liquid or soft rubbery polymers which are useful for a variety of commercial applications.

It is thus an object of this invention to provide a process for the polymerization of butadiene.

Another object of this invention is to provide a process for the production of liquid or soft polymers of butadiene.

Another object of this invention is to provide a novel catalyst system for the polymerization of 1,3-butadiene to form liquid and soft polymers.

Other aspects, advantages and objects of this invention will be apparent to those skilled in the art upon studying the accompanying disclosure and claims.

Niobium halides and oxyhalides employed in the catalyst systems of this invention include niobium pentabromide, niobium pentachloride, niobium pentafluoride, niobium oxytribomide, and niobium oxytrichloride. The niobium trihalodicarboxylates can be represented by the formula $NbX_3(OCOR')_2$ wherein X is a halogen, i.e., fluorine, chlorine, bromine, or iodine, and R' is a saturated or unsaturated aliphatic or cycloaliphatic radical or an aromatic radical, or combinations thereof, containing from 3 to 29 or more carbon atoms. These compounds can be prepared by reacting an organic acid with niobium pentachloride in a halogenated hydrocarbon diluent, such as chloroform, carbon tetrachloride, tetrachloroethane, or the like or a hydrocarbon diluent such as n-hexane, n-pentane, cyclohexane, benzene, toluene, xylene, or the like. Organic acids which can be employed include butyric acid, caprylic acid, capric acid, lauric acid, myristic acid, palmitic acid, stearic acid, nonadecanoic acid, arachidic acid, methacrylic acid, crotonic acid, 9-decenoic acid, 9-dodecenoic acid, oleic acid, linoleic acid, linolenic acid, cyclohexanecarboxylic acid, cyclohexaneacetic acid, 10-methylhendecanoic acid, benzoic acid, and other acids designated as naphthenic acids, e.g., cyclopentanecarboxylic acid, cyclopentylacetic acid, 3-methylcyclopentylacetic acid, 4 - methylcyclohexanecarboxylic acid, 2,2,6-trimethylcyclohexanecarboxylic acid, and the like. Mixtures of any two or more of these acids can be employed. The niobium trihalodicarboxylates are preferred because they are soluble in the hydrocarbon diluents employed in the polymerization.

The organometallic compounds and lithium aluminum hydrides that can be used in the process of our invention are compounds having the formula $R_mAlCl_n$, $$LiAlH_xR_{(4-x)}$$

or $R_yM$ wherein R is a saturated aliphatic, saturated cycloaliphatic or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal. Mixtures of the foregoing organometallic compounds can be used. Preferred organometallic compounds include trialkylaluminum compounds and lithium aluminum tetraalkyl compounds.

Examples of suitable organometallic compounds include trimethylaluminum, triethylaluminum, triisobutylaluminum, tri - n - eicosylaluminum, triphenylaluminum, methylaluminum sesquichloride, ethylaluminum sesquihalide, lithium aluminum, dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl, n-butyllithium, 4-tolylaluminum dichloride, diphenylaluminum chloride, 2-naphthyllithium, diethylmagnesium, diphenylmagnesium, trimethylgallium, diethylphenylgallium, tribenzylgallium, 4 - methylcyclohexylpotassium, benzyllithium, n-eicosyllithium phenylsodium, cyclohexylpotassium, isobutylrubidium, n-nonylcesium, diethylberyllium, diphenylberyllium, diethylzinc, dicyclopentylzinc, di-n-propylcadmium, dibenzylcadmium, trimethylindium, triphenylindium, and the like.

The nickel compounds used in this invention are those nickel compounds that are capable of being reduced by the above-described organometallic compounds. In the desired reduction reaction the nickel is reduced to a lower valence state. The desired reduction is accomplished by contacting the nickel compound with the above-described organometallic compound or lithium aluminum hydride. Suitable reducible nickel compounds include nickel oxide, nickel salts of inorganic acids and organic acids containing 2–20 carbon atoms, nickel salts of beta-diketones of the formula:

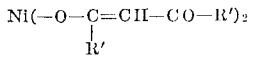

wherein R' is a saturated aliphatic, saturated cycloaliphatic or aromatic radical or combination thereof, containing from 1 to 10 carbon atoms, and complex compounds such as dicyclopentadienylnickel, and the nickel complex with the ethyl ester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salts of the beta-diketones include the nickel salts of 2,4-pentanedione (acetylacetone), 3,5-heptanedione, 1,5 - dicyclopentyl-2,4-pentanedione, and the like. Mixtures of the foregoing nickel components can be used.

Nickel compounds that are reduced with the lithium aluminum hydride or the organometallic compounds are preferred in the process of our invention.

It is within the scope of our invention to utilize nickel components that are supported on various carriers such as diatomaceous earth, silica-alumina, silica, alumina, titania, zirconia, kaolin, ion-exchange resins and the like. The reducible nickel compound, such as nickel oxides and the like, can be supported on the above-mentioned carriers.

The catalyst compositions used in this invention are formed by combining the lithium aluminum hydride or the organometallic compound and the nickel component prior to introduction of the niobium compound. The lithium aluminum hydride or the organometallic compound and the nickel compound can be combined in the presence of a hydrocarbon diluent. Suitable hydrocarbon diluents include those that are also suitable as a polymerization diluent. The diluent can be a paraffinic, cycloparaffinic, or aromatic hydrocarbon such as n-pentane, n-hexane, isooctane, cyclohexane, benzene, toluene, and the like. The mixture of the lithium aluminum hydride or the organometallic compound and the nickel component is maintained at a temperature in the range of about 20 to 70° C. for a sufficient length of time to produce an active catalyst component. The aging time is dependent upon the particular compounds used and on the temperature of the reaction. Generally, the aging time will be in the range of about 5 minutes to 25 hours. If a reducible nickel compound is used, it undergoes a reduction type reaction wherein the nickel is reduced to a lower valence state during the aging step.

It has been found that when the concentrations of the lithium aluminum hydride or the organometallic compound and the nickel component are quite low, the aging time may have to be increased slightly. After the desired aging has been achieved, the niobium compound catalyst component is added to the polymerization zone with the other catalyst components and monomer and the polymerization reaction is allowed to proceed. The 1,3-butadiene monomer can be added to the polymerization zone either prior to or after the introduction of the niobium compound catalyst component. The ratio of the nickel component to the lithium aluminum hydride or the organometallic compound is in the range of 0.1 to 6 gram atoms of nickel per gram mole of lithium aluminum hydride or organometallic compound with from 0.5 to 3 being preferred.

The mole ratio of the niobium compound to the lithium aluminum hydride or the organometallic compound is in the range of 0.1:1 to 25:1. The preferred mol ratio of niobium compound to organometallic compound or lithium aluminum hydride is from 1:1 to 12:1. The total catalyst level in the polymerization system is based on the nickel component and is generally in the range of about 0.25 to 10 gram atoms of nickel per 100 grams of the monomer. The preferred amount of the nickel component is generally in the range of about 1 to 4 gram atoms of nickel per 100 grams of the monomer.

The polymerization is generally carried out in the presence of a hydrocarbon diluent. Suitable diluents include paraffinic, cycloparaffinic and aromatic hydrocarbons such as n-pentane, n-hexane, isooctane, cyclohexane, benzene, toluene, and the like and mixtures of the above. It is desirable to carry out the polymerization at a pressure such that at least a portion of the 1,3-butadiene monomer is in the liquid phase. The polymerization is usually carried out at a temperature in the range of 0 to 250° F. with a temperature in the range of 50 to 200° F. being preferred.

The polymers prepared according to this invention can be hydrogenated following polymerization by introducing hydrogen into the polymerization mixture in the presence of the catalyst employed for the polymerization for a time and under conditions such that the desired number of double bonds are hydrogenated. Conditions for the hydrogenation reaction include temperatures in the range of about 50 to 500° F. and gage pressures up to about 1000 pounds per square inch. Preferred conditions are temperatures of 170 to 400° F. and pressures of 10 to 500 pounds per square inch gage. The reaction time can vary from one minute to 25 hours or more, preferably 15 minutes to 10 hours, depending upon the extent of hydrogenation desired.

The liquid polymer products produced in accordance with this invention have many properties that make them valuable for a variety of commercial applications. The polymers produced in accordance with my invention can be used as plasticizers for thermoplastics, in potting compounds for the electronics industry, in adhesive formulations, as binders for solid fuel rocket motors, and in coating formulations for textiles and the like. The hydrogenated liquid polymers can be used in similar applications where increased oxidative stability is desirable.

It will be apparent to those skilled in the art that various modifications and changes may be made in the foregoing disclosure without departing from the spirit and scope of our invention.

The following examples are submitted to illustrate preferred embodiments of our invention. The examples should not be considered in such a way as to unduly limit the scope of our invention.

EXAMPLE I

Butadiene was polymerized in a series of runs in the presence of niobium trichloride distearate, nickel naphthenate, and triethylaluminum as the catalyst. The following recipe was used:

|  | Run A | Run B | Run C |
| --- | --- | --- | --- |
| 1,3-butadiene, parts by weight | 100 | 100 | 100 |
| Cyclohexane, parts by weight | 780 | 780 | 780 |
| Nickel naphthenate, mhm | 1 | 1 | 1 |
| Triethylaluminum (TEA), mhm | 6 | 5 | 5 |
| Niobium trichloride distearate (NbCl₃St₂), mhm | 1 | 0.5 | 5.0 |
| Ni compound: TEA mole ratio | 0.167:1 | 0.2:1 | 0.2:1 |
| NbCl₃St₂:TEA mole ratio | 0.167:1 | 0.1:1 | 1:1 |
| Temperature, ° F | 158 | 122 | 122 |
| Time, hours | 3 | 4 | 4 |
| Conversion, percent | 25 | 12.4 | 40.0 |

NOTE: Mhm.=gram millimoles per 100 grams monomer.

When conducting a polymerization, cyclohexane was charged first after which the reactor was purged with nitrogen. Butadiene was added followed by the nickel naphthenate, triethylaluminum, and then the niobium trichloride distearate. The temperature was adjusted to the indicated level following charging of the ingredients and was maintained at this level for the polymerization. The mixture was agitated throughout the polymerization period.

The niobium trichloride distearate employed was prepared by reacting stearic acid with niobium pentachloride in cyclohexane. The recipe was as follows:

Cyclohexane, ml.: 250
Stearic acid, grams: 25 (0.088 mole)
Niobium pentachloride, grams: 12.3 (0.045 mole)

The materials were charged to the reactor which was then purged with nitrogen for 10 minutes. The temperature was adjusted to 158° F. and maintained at this level for one hour. The reactor was then vented, purged with nitrogen for 15 minutes, and the contents were stored at room temperature. The niobium trichloride distearate was soluble in cyclohexane. The calculated molarity of the solution was 0.18.

At the conclusion of each of the polymerization runs the reaction was shortstopped with a 10 weight percent solution of 2,2' - methylene - bis(4 - methyl - 6-tert-butylphenol) in a mixture of equal parts by volume of isopropyl alcohol and toluene. The polymer was coagulated is isopropyl alcohol, separated, and dried. The product of each run was a liquid.

These data show that liquid polymers were obtained using a catalyst system of the invention.

EXAMPLE II

Butadiene was polymerized in the presence of niobium pentachloride, nickel naphthenate and triethylaluminum as the catalyst. The following recipe was used:

|  | Run 1 | Run 2 |
|---|---|---|
| 1,3-butadiene, parts by weight | 100 | 100 |
| Cyclohexane, parts by weight | 780 | 780 |
| Nickel naphthenate, mhm | 1.0 | 1.0 |
| Triethylalumium (TEA), mhm | 5.0 | 5.0 |
| Niobium pentachloride (NbCl$_5$) mhm | 1.0 | 5.0 |
| Temperature, ° F | 122 | 122 |
| Time, hours | 4 | 4 |
| Ni compound:TEA mole ratio | 0.2:1 | 0.2:1 |
| NbCl$_5$:TEA mole ratio | 0.2:1 | 1:1 |

NOTE: Mhm.=gram millimoles per 100 grams monomer.

The polymerizations were conducted by charging the cyclohexane after which the reactor was urged with nitrogen. Butadiene was added followed by the nickel naphthenate, triethylaluminum, and then the niobium pentachloride. The temperature was adjusted to the indicated level following charging of the ingredients and was maintained at this level for the polymerization. The mixtures were agitated throughout the polymerization period.

At the conclusion of the polymerizations the reactions were short-stopped and the polymers recovered as in Example I.

Infrared scanning of the polymers of Examples I and II showed that microstructure of the polymers are a function of the nobium level used. Low niobium levels produce high vinyl polymers, high niobium levels result in high 1,4-addition, predominantly high cis-unsaturation. Thus, it is within the scope of the invention to regulate the microstructure of the polymer by regulating the amount of niobium compound in the system.

Reasonable variations and modifications of this invention can be made, or followed, in view of the foregoing disclosure, without departing from the spirit or scope thereof.

I claim:

1. A catalyst composition which forms on mixing components comprising at least one niobium compound selected from the group consisting of a niobium halide, a niobium oxyhalide and a niobium trihalodicarboxylate and a mixture of (1) lithium aluminum hydride or at least one organometallic compound having the formula $R_mAlCl_n$, $LiAlH_xR_{(4-x)}$, or $R_yM$ wherein R is a saturated aliphatic, saturated cycloaliphatic, or aromatic radical, or combination thereof, containing from 1 to 20 carbon atoms, $m$ and $n$ are integers of 1 to 2 such that $m+n$ is 3, $x$ is an integer of 1 to 4, M is lithium, sodium, potassium, rubidium, cesium, beryllium, magnesium, zinc, cadmium, aluminum, gallium, or indium, and $y$ is an integer equal to the valence of the metal and (2) a nickel component selected from the group consisting of metallic nickel having a large surface area for its weight and a reducible nickel compound capable of being reduced by said lithium aluminum hydride or said organometallic compound.

2. The composition of claim 1 wherein the ratio of said nickel component to said lithium aluminum hydride or said organometallic compound is in the range of 0.1 to 6 gram atoms of nickel per gram mol of lithium aluminum hydride or organometallic compound, and the mol ratio of said niobium compound to said lithium aluminum hydride or said organometallic compound is in the range of 0.1:1 to 25:1.

3. The composition of claim 2 wherein said nickel component is a nickel salt of a fatty acid containing up to 40 carbon atoms and said organometallic compound is a trialkylaluminum compound.

4. The composition of claim 3 wherein said nickel salt of a fatty acid is nickel stearate and said trialkylaluminum compound is triethylaluminum, and the niobium compound is niobium trichloride distearate.

5. A process for producing polybutadiene which comprises contacting 1,3-butadiene with the catalyst composition of claim 1 and recovering the polymer so produced.

6. The process of claim 5 wherein said contacting takes place in the presence of a diluent selected from the group consisting of paraffins, cycloparaffins, and aromatic hydrocarbons.

7. The process of claim 6 wherein said contacting takes place at a temperature in the range of about 0° to 250° F.

8. The process of claim 7 wherein the ratio of said nickel component to said lithium aluminum hydride or said organometallic compound is in the range of 0.25 to 6 gram atoms of nickel per gram mol of lithium aluminum hydride or organometallic compound, the mol ratio of said niobium compound to said lithium aluminum hydride or said organometallic compound is in the range of 0.1:1 to 25:1 and from 0.25 to 10 gram atoms of said nickel are present for each 100 grams of butadiene in the polymerization system.

9. The process of claim 8 wherein said organometallic compound is a trialkylaluminum compound, said nickel component is a nickel salt of a fatty acid containing up to 40 carbon atoms, and said niobium compound is a niobium trihalodicarboxylate.

10. The process of claim 5 wherein said polybutadiene is hydrogenated prior to recovery of same as a product of the process.

References Cited
UNITED STATES PATENTS

| 3,063,979 | 11/1962 | Truett et al. | 260—94.9 |
| 3,328,378 | 6/1967 | Piekarski et al. | 260—94.9 |
| 3,397,194 | 8/1968 | Swift | 260—85.3 |
| 3,428,699 | 2/1969 | Schleimer | 260—669 |

JOSEPH L. SCHOFER, Primary Examiner

R. A. GAITHER, Assistant Examiner

U.S. Cl. X.R.

252—428, 429, 430, 431, 441; 260—683.15